United States Patent
Saunders (10) Patent No.: US 8,046,155 B2
(45) Date of Patent: Oct. 25, 2011

(54) METHOD AND APPARATUS FOR MISFIRE DETECTION USING ENGINE CYCLES AT LEAST SUBSEQUENT TO ACTUAL MISFIRE EVENT

(75) Inventor: Jonathan Saunders, Coventry (GB)

(73) Assignee: Denso Corporation, Kariya (JP)

( * ) Notice: Subject to any disclaimer, the term of this patent is extended or adjusted under 35 U.S.C. 154(b) by 20 days.

(21) Appl. No.: 12/379,147

(22) Filed: Feb. 13, 2009

(65) Prior Publication Data
US 2010/0211296 A1 Aug. 19, 2010

(51) Int. Cl.
*G06F 19/00* (2011.01)
(52) U.S. Cl. ......... 701/111; 701/106; 701/115; 702/185
(58) Field of Classification Search .................. 701/106, 701/111, 114, 115; 702/182, 183, 185, 187
See application file for complete search history.

(56) References Cited

U.S. PATENT DOCUMENTS

| | | | | |
|---|---|---|---|---|
| 5,200,899 A | * | 4/1993 | Ribbens et al. | 701/111 |
| 5,237,504 A | * | 8/1993 | Holmes et al. | 701/111 |
| 5,287,282 A | * | 2/1994 | Imai | 701/111 |
| 5,440,922 A | * | 8/1995 | Ichikawa | 73/114.04 |
| 5,503,008 A | * | 4/1996 | Machida | 73/114.03 |
| 5,506,778 A | * | 4/1996 | Matsumoto et al. | 701/111 |
| 5,509,302 A | * | 4/1996 | Drexel et al. | 73/114.05 |
| 5,515,281 A | * | 5/1996 | Palazzetti et al. | 701/111 |
| 5,539,644 A | * | 7/1996 | Ichikawa et al. | 701/111 |
| 5,544,058 A | * | 8/1996 | Demizu et al. | 701/29 |
| 5,561,600 A | * | 10/1996 | McCombie | 701/111 |
| 5,728,941 A | | 3/1998 | Yamamoto et al. | |
| 6,968,268 B2 | | 11/2005 | Yamada et al. | |

FOREIGN PATENT DOCUMENTS

JP 06-336948 12/1994

\* cited by examiner

*Primary Examiner* — Thomas Moulis
*Assistant Examiner* — Raza Najmuddin
(74) *Attorney, Agent, or Firm* — Nixon & Vanderhye P.C.

(57) ABSTRACT

In a method of monitoring for a misfire event in an internal combustion engine signals representative of engine speed are monitored for successive engine revolutions subsequent to each firing event. The monitored signals are stored (e.g., in a buffer) and processed to detect changes in the monitored speed signals. Changes in monitored speed signals that are indicative of an actual misfire event are detected and a misfire count is changed in response thereto.

13 Claims, 6 Drawing Sheets

| | | | | | | |
|---|---|---|---|---|---|---|
| Misfire Confirmed | - | - | - | - | N | Y |
| Total | 563 | 887 | 823 | 200 | 731 | 1023 |
| rCompData>rThrs180SResult (Bit 0) | 1 | 1 | 1 | 0 | 1 | 1 |
| rOmgDif360>rThrs360SResult (Bit 1) | 1 | 1 | 1 | 0 | 1 | 1 |
| rOmgDif720>rThrs720SResult (Bit 2) | 0 | 1 | 1 | 0 | 0 | 1 |
| rCompDataCtHt>ThrsCtHt180S (Bit 3) | 1 | 0 | 0 | 1 | 1 | 1 |
| rOmgDif360CtHt>ThrsCtHt360S (Bit 4) | 1 | 1 | 1 | 0 | 1 | 1 |
| rOmgDif720CtHt>ThrsCtHt720S (Bit 5) | 0 | 1 | 1 | 0 | 0 | 1 |
| rSMCompData>rSMThrs180S (Bit 6) | 0 | 1 | 0 | 1 | 1 | 1 |
| rSMCompDataCtHt>SMThrsCtHt180S (Bit 7) | 0 | 0 | 0 | 1 | 1 | 1 |
| CompCtHt<360CtHt (Bit 8) | 0 | 1 | 1 | 0 | 0 | 1 |
| 360CtHt<720CtHt (Bit 9) | 1 | 1 | 1 | 0 | 1 | 1 |
| Only confirm misfire IF Bits of CBD MISF CtHt ResultX=1 AND corresponding bits of Rbd Misf CtHtResult=1 | Rbd_MISF_CtHtResult (not misfire) | Rbd_MISF_CtHtResult (int misfire) | CBD_MISF_CTHTRESULT(n) | [NOT] CBD_MISF_CTHTRESULT(n) | {[NOT] cCtHtResult(n)} [OR] rCtHtResult (not misfire) | {[NOT] cCtHtResult(n)} [OR] rCtHtResult (int misfire) |

METHOD AND APPARATUS FOR MISFIRE DETECTION USING ENGINE CYCLES AT LEAST SUBSEQUENT TO ACTUAL MISFIRE EVENT

BACKGROUND

1. Technical Field

Example embodiments of the present invention relate to a method and apparatus for misfire detection for an internal combustion engine.

2. Related Art

Misfire detection is part of the requirements for any modern internal combustion engine, particularly for use in the automotive sector. The aim of misfire detection is to identify a misfire on any cylinder, including identification of the misfiring cylinder in a multi-cylinder engine.

There are various reasons for wishing to detect misfires, including a desire to identify misfires to avoid potential catalyst damage, and also to detect a potential deterioration in emissions performance of the internal combustion engine. An engine management system can be configured to set a fault status and, for example, to illuminate a malfunction indicator lamp in response to a certain rate of misfires (for example, a misfire per 1000 engine revolutions).

It is desirable to correctly identify all actual misfires as misfires if possible. It is also desirable to avoid identifying other events which do not actually represent misfires (due, for example, to engine operating conditions) as misfires in order to avoid an erroneous indication of a fault condition.

Indeed, different operating phases for an internal combustion engine can lead to noisy situations where the detection of a misfire compared to normal changes in the operating state of the internal combustion engine can be very difficult to detect.

The difficulty of detection arises at least in part due to the momentum of the moving parts within the engine, whereby a single misfire event may result in a very gradual decay in the speed of the engine. Such a gradual change in the speed as a result of a misfire may be barely discernable from a situation where there is a reduction in speed due, for example, to an additional load being placed on the engine.

Accordingly, example embodiment(s) of the present invention seeks to provide for improved misfire detection in an internal combustion engine, for example, in operating states of the internal combustion engine that place particular demands on misfire detection.

SUMMARY

An example embodiment of the present invention relates to a method of monitoring for a misfire event in an internal combustion engine. The method can include: monitoring speed signals representative of engine speed for successive engine revolutions subsequent to a firing event; storing the monitored speed signals for each revolution in a machine readable storage medium; processing the stored monitored speed signals to detect changes in the monitored speed signals; detecting changes in the monitored speed signals indicative of an actual misfire event; and changing a misfire count in response to detected changes in the monitored speed signals indicative of the firing event being an actual misfire event.

An embodiment of the invention can also provide an engine control unit for an internal combustion engine. The engine control unit can include misfire detection programmed logic operable to monitor for a misfire event in the internal combustion engine, the misfire detection logic comprising: programmed signal monitor logic operable to monitor speed signals representative of engine speed for successive engine revolutions subsequent to a firing event; storage logic operable to store the monitored speed signals for each revolution in a machine readable storage medium; programmed processing logic operable to process the stored monitored signals to detect changes in the monitored speed signals; programmed detection logic operable to detect changes in the monitored speed signals indicative of an actual misfire event; and a misfire counter logic operable change a misfire count in response to detected changes in monitored speed signals indicative of the firing event being an actual misfire event.

An internal combustion engine system can include an internal combustion engine and such an engine control unit.

An example embodiment of the invention can be implemented by means of program code (e.g., programmed logic) executable to carry out a method as set out above. The program code can be provided on a computer readable storage medium.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE FIGURES

Example embodiments of the present invention will now be described by way of example only with reference to the accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

An embodiment of a method and apparatus is described in which speed signals representative of the speed (e.g. angular velocity signals) of an internal combustion engine are monitored for successive engine revolutions in respect of each firing event. The monitored speed signals are buffered and the monitored signals buffered for at least a part of a previous engine cycle are processed to detect changes in the monitored speed signals. Changes in monitored speed signals that are indicative of a misfire event are detected and a misfire count is changed in response thereto. In the embodiment, detection of a misfire event is delayed with respect to the misfire event, in order to use engine recovery after misfire as an additional, and potentially more reliable, indication of a misfire event.

Figure 1:
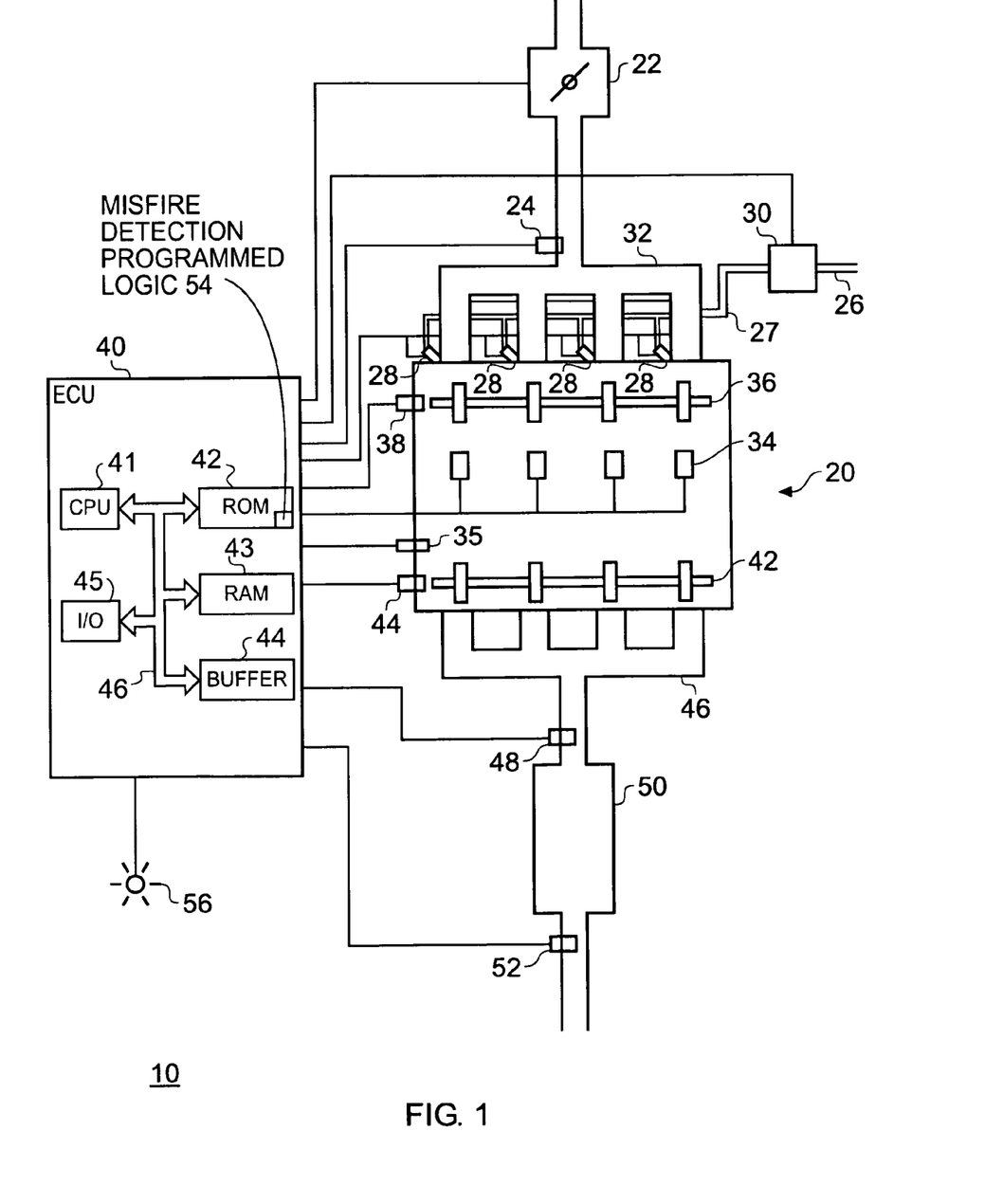
FIG. 1 is a schematic representation of an example of an internal combustion engine according to an example embodiment of the present invention.

FIG. 1 provides a schematic overview of an engine system 10 including an internal combustion engine 20. The internal combustion engine 20 represented in FIG. 1 is a four cylinder gasoline engine. The engine system is controlled by an engine management system that includes an engine control unit (ECU) 40 connected and various sensors and control subsystems of the engine system 10 to which the ECU is connected. An electronic control unit (ECU) 40 may include a central processing unit (CPU) 41 for executing programmed logic (thereby forming programmed logic circuitry), a ROM 42 for storing control programs such as misfire detection programmed logic 54 and control data, a RAM 43 for storing various data, a buffer memory 44, an input/output circuit 45 for communicating data signals from sensors, and a bus line 46. The CPU 41 of the ECU 40 executes, for example, the procedure of the misfire detection programmed logic 54 shown as a flow chart of FIG. 4—thereby forming misfire detection programmed logic circuitry (including components such as signal monitoring programmed logic circuitry, processing programmed logic circuitry, detection programmed logic circuitry, misfire counter programmed logic circuitry, etc. resulting from respective execution of programmed logic 100, 104, 120, 124 described below). The ECU 40 controls the operation of a throttle 22 at the intake side of the engine. A manifold pressure sensor 24 in an intake manifold 32 provides control signals to the ECU 40. A fuel injector 28 for each cylinder is connected to a fuel supply line 27. In the present example, the fuel injectors are represented as direct fuel injectors that inject fuel directly into each cylinder. In another example, the fuel injectors could be port injectors that inject fuel into the intake port of a cylinder. A pressure regulator 30 is used to control fuel pressure from a fuel supply line 26 to the fuel supply line 27. The individual injectors 28 receive control signals from the ECU 40 to control the timed injection of fuel. Spark plugs 34 receive ignition timing (IGT) signals from the ECU 40.

The engine control unit 40 receives and processes signals from a crank sensor 35 that indicate rotation of the crankshaft of the engine. The engine control unit 40 also receives and processes signals from camshaft sensors 38 and 44 indicating the timing of the rotation of intake and exhaust camshafts 36 and 42, respectively. The intake and exhaust camshafts 36 and 42 respectively control intake and exhaust valves (not shown). The engine control unit receives and processes other signals from other sensors (not shown) in a conventional manner such that the engine control unit is able to monitor operating parameters such as engine speed, engine load, etc. The engine control unit 40 also receives and processes control signals from a universal heated exhaust gas oxygen (UHEGO) sensor 48 and a heated exhaust gas oxygen (HEGO) sensor 52. In the example shown, the UHEGO sensor 48 and the HEGO sensor 52 are located either side of a catalytic converter 50, downstream of the exhaust manifold 46. However, in other examples the positioning of UHEGO sensor 48 and/or the HEGO sensor 52 could be different. The ECU 40 includes a misfire detection unit 54 that is described in more detail with respect to FIGS. 2 to 4. A malfunction indicator lamp (MIL) 56 can be used to indicate a reportable malfunction.

It should be noted that a four cylinder engine is illustrated in FIG. 1 for ease of explanation only, and that an embodiment of the invention may include four or another number of cylinders. For example, in the following description it is assumed that the internal combustion engine includes 8 cylinders arranged in two banks of four cylinders. Accordingly, the view of the cylinder head of the bank of four cylinders may be as shown in FIG. 1 except that an intake manifold is provided for each bank, with each bank being connected to the throttle 22, and that an exhaust manifold is provided for each bank with each exhaust manifold either connected to respective exhaust systems or to a common exhaust system. It should be further noted that although FIG. 1 illustrates a spark ignition engine, this present example embodiment is equally applicable to compression ignition engines.

The misfire detection unit 54 can be operable to detect and manage misfire events by monitoring signals from the crank sensor 35 over successive revolutions of the internal combustion engine.

Figure 2:
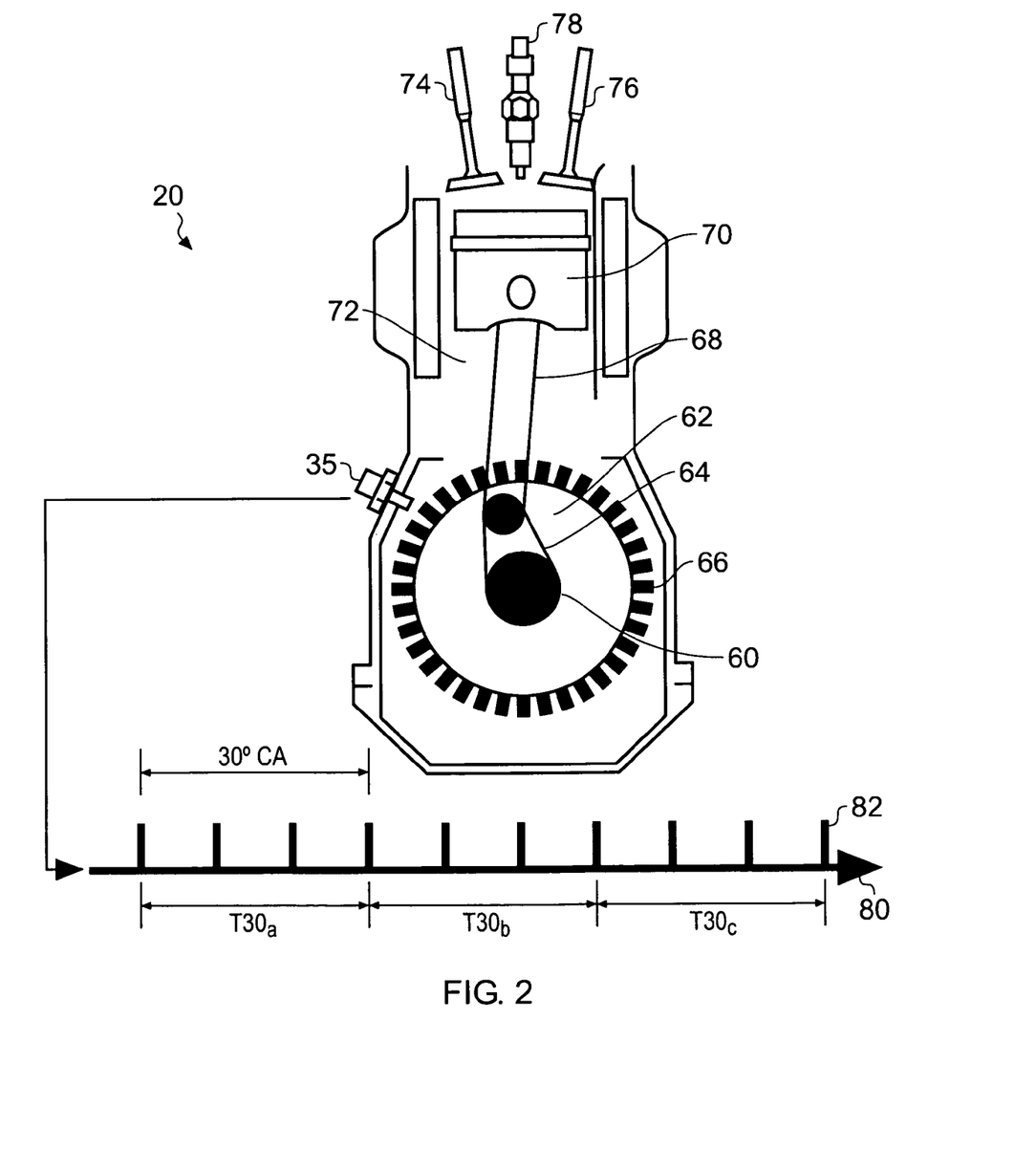
FIG. 2 is a schematic representation of the operation of a crank sensor.

FIG. 2 is a schematic representation indicating the generation of crank signals from a crank sensor 35. As shown in FIG. 2, the internal combustion engine 20 includes a crank pulley 62 mounted on the crank shaft 60. The crank pulley 62 is provided with teeth 66 and, on rotation of the crank shaft 60, and consequently of the crank pulley 62, the rotation of the teeth 66 can be detected by the crank sensor 35. The piston 70 is caused to reciprocate within the cylinder 72 under the action of the crank arm 64 and the piston rod 68. The valves 74 and 76 are caused to open and close at predetermined times during rotation of the crank shaft 60 either by means of the rotation of cam shafts, rotated, for example, by means of a timing belt or timing chain, possibly including a variable valve timing mechanism, or by electronic means. Similarly, in the case of a spark ignition engine, the timing of a spark from the spark plug 78 is timed by the ECU 40 to provide for combustion of a fuel air mix in the combustion chamber above the piston 70 and to cause rotation of the engine. In the case of a compression ignition engine, cylinder pressure rise causes combustion of a fuel air mix in the combustion chamber above the piston 70 and to cause rotation of the engine.

The rotational speed of the crank shaft 60 is not constant, but increases in response to a combustion event, and then, due to frictional resistance and compressive forces, gradually slows until the next combustion event.

Angular velocity ($\omega$) can be used as a parameter for engine speed. The operation of this parameter is the same as that of an "engine speed (RPM)" parameter, which is commonly used for engine control. Engine speed can be sampled at many points around the cycle, for example at each combustion. For example, combustion occurs at intervals of 120° CA (crank angle) with a six cylinder engine, and occurs at every 90° CA with an eight cylinder engine.

In an example embodiment of the invention, crank signals are produced at every 10° CA and, based on the crank signals, the engine speed, or angular velocity, is calculated at angles of 30° CA. However, the crank signals could be produced at a different crank angle and/or the engine speed, or angular velocity, could be calculated at angles other than 30° CA. For ease of illustration, FIG. 2 illustrates an example where crank signals are produced at every 10° CA and, based on the crank signals, the engine speed, or angular velocity, is calculated at angles of 30° CA.

In the example shown in FIG. 2, angular velocity can be measured by reading the teeth 66 at intervals of 10° CA apart on the crank pulley 62 using the crank position sensor 35 and measuring the time (T30) for each 30° CA. The angular velocity value can be calculated, for example, as:

$$\omega = 90°CA/(T30a + T30b + T30c).$$

Based on successive calculations of the angular velocity, a reduction in the angular velocity can be calculated by subtracting one angular velocity value from another to generate a delta of the angular velocity.

For example, for an eight cylinder engine, a reduction in velocity between adjacent angular velocity values could be detected using the following equation:

$$\Delta\omega\#n = \omega\#n - \omega\#(n-1),$$

where $\Delta\omega\#n$ is representative of an nth delta omega value, $\omega\#n$ is an nth angular velocity value and $\omega\#(n-1)$ is the preceding angular velocity spaced from the nth by 30° CA.

Although such a calculation as described above can provide a determination of a change in velocity, despite an engine rotating at a constant speed, a calculated angular velocity value can fluctuate due to the teeth spacing on the crank pulley being imperfect, for example that there are different spacings between respective teeth. In view of this, false detection of a misfire could potentially occur during normal operation. In view of this, it is known to compute the change in angular velocity by determining a delta omega value ($\Delta\omega$) for each successive angular velocity ($\omega$) from the corresponding angular velocity ($\omega$) determined one revolution before:

$$\Delta\omega\#n = \omega\#n - \omega\#(n-4),$$

for an eight cylinder engine. This $\Delta\omega$ value enables elimination of differences in tooth spacing on the crank pulley. This compensated $\Delta\omega$ calculation can be known as 360° CA difference method.

To improve detection of an intermittent misfire, it is also known to apply a 720° CA difference method. The difference between the known 720° CA difference method and the 360° CA difference method is that the former uses the angular velocity 720° CA before the angular velocity for the same cylinder. As with the 360° CA difference method, the 720° CA intervals can eliminate differences in the tooth spacing on the crank pulley.

It is also known to apply a 180° CA difference method. The difference between the known 180° CA difference method and the 360° CA difference method is that the former uses the angular velocity derived from angular velocity not from the same cylinder or same CA portion.

However, as indicated previously, due to the momentum in the working parts of the internal combustion engine, the known techniques described above, although effective under normal operating conditions, can still have difficulty in correctly identifying misfires under difficult operating conditions of the internal combustion engine, for example during a catalytic heating phase where extra load is applied to the engine in order rapidly to heat the catalytic converter.

As mentioned above, in a conventional strategy for identifying a misfire, a current angular velocity value is compared to a previous fired event, for example 720°, 360° or 180° prior to the actual misfire event. Accordingly, the calculation point for a misfired event is coterminous with the misfire event itself, whereby the conventional approach is to detect the decay in the engine speed resulting from the misfire event.

In contradistinction thereto, in an example embodiment of the present invention, the calculation point for detecting a misfired event is delayed (i.e., subsequent to and not coterminating with) and a comparison of the misfired event is made by comparison of the angular velocity for the misfired cylinder to an angular velocity of the next fired event 720°, 360° or 180° displaced with respect thereto.

As a result, an example embodiment of the invention can detect the recovery following a misfire event due to a subsequent misfiring which is typically much more rapid than the decay following a misfire event.

Figure 3:
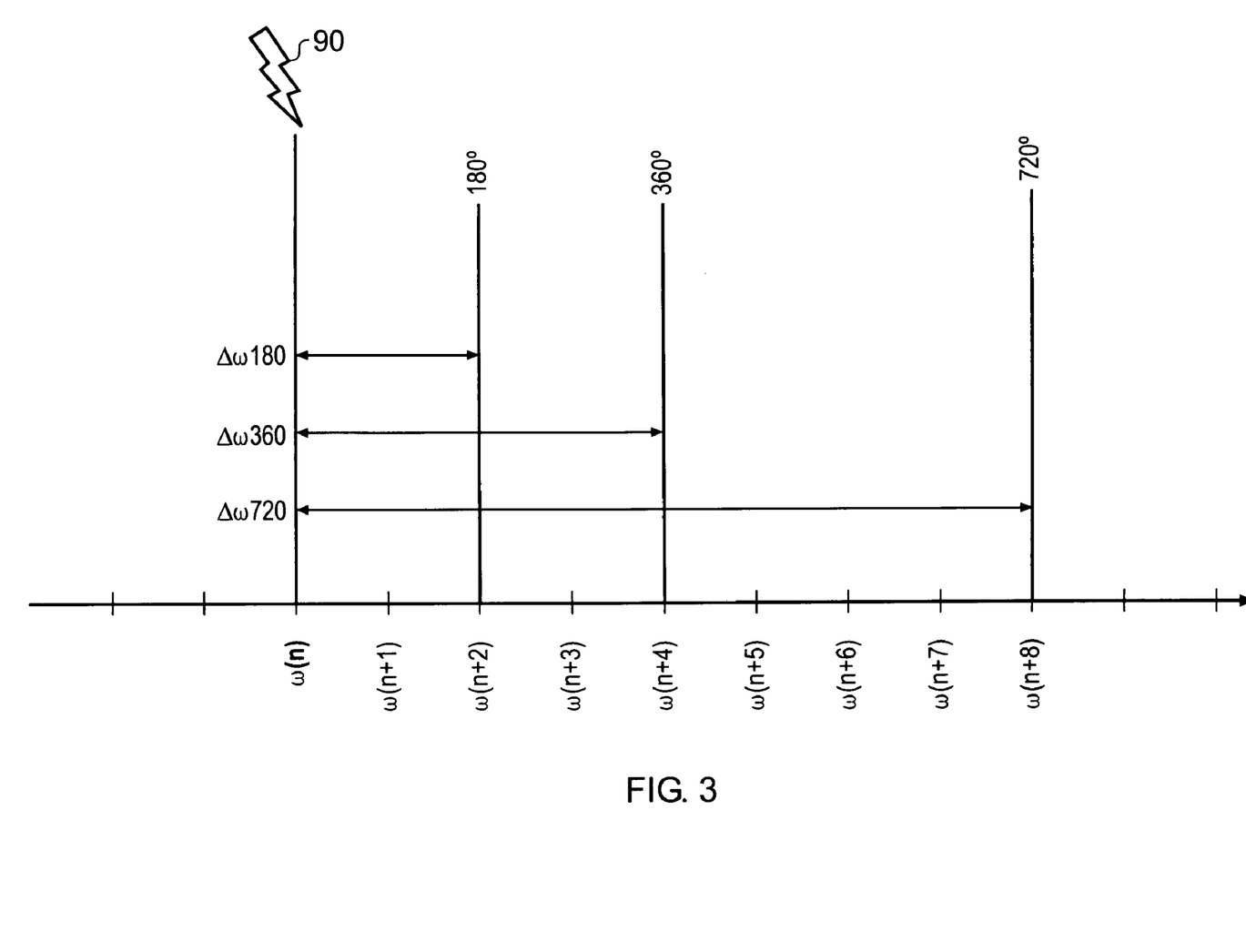
FIG. 3 is a schematic representation of the determination difference signals derived from sensed crank signals.

FIG. 3 illustrates this schematically, whereby successive angular velocity ($\omega$) values are calculated as shown on the horizontal axis, at subsequent times, and delta omega values $\Delta\omega$ 180, $\Delta\omega$ 360 and $\Delta\omega$ 720 are determined at 180°, 360° and 720°, respectively, with respect to a potential misfire event 90 (thereby defining a potential misfire measuring point 90).

The $\Delta\omega$ 180 value is calculated as $(\omega(n-7)-\omega(n+1))/8-(\omega(n+1)-\omega(n))$. The $\Delta\omega$ 360 value is calculated as $(\omega(n)-\omega(n+1))-(\omega(n+4)-\omega(n+5))$. The $\Delta\omega$ 720 value is calculated as $(\omega(n)-(\omega(n+1))-(\omega(n+7)-\omega(n+8))$.

Accordingly, as represented in FIG. 3, in accordance with the present example embodiment, a misfire calculation is delayed by 720° (representing the next firing) for the calculation of $\Delta\omega$ 180, $\Delta\omega$ 360 and $\Delta\omega$ 720 for the misfire event to the firing event after the misfire. Also as represented in FIG. 3, the calculation of $\Delta\omega$ 180, $\Delta\omega$ 360 and $\Delta\omega$ 720 form separate values for determining whether a potential misfire is an actual misfire. However, the determination of these separate values are based on measurements which occur simultaneously (i.e., overlapping in time). FIG. 3 thus illustrates multiple ways of determining whether a potential misfire is an actual misfire subsequent to the misfire itself.

Figure 4:
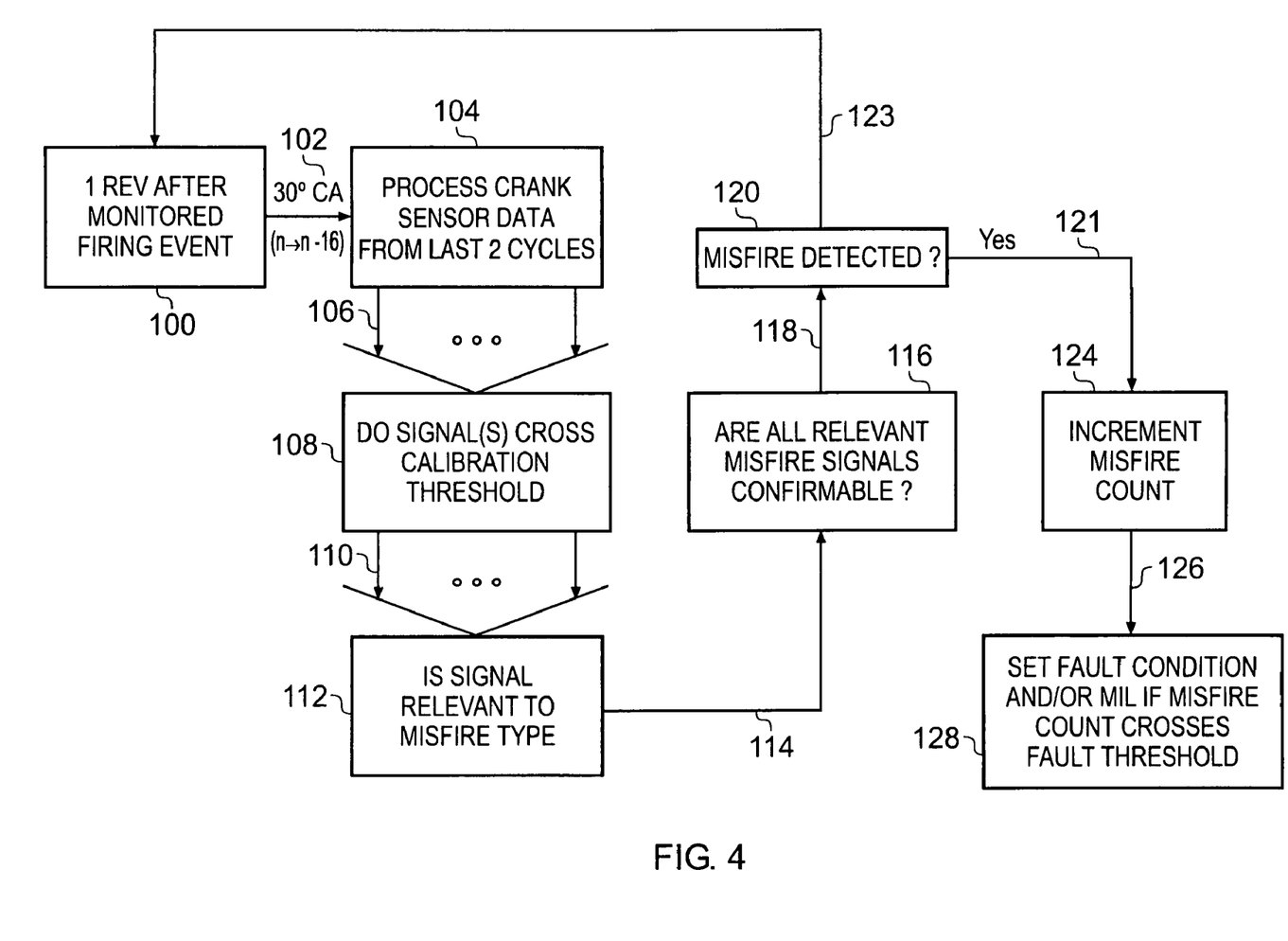
FIG. 4 is a block diagram illustrating parts of an engine control unit in accordance with an example embodiment of the present invention.

FIG. 4 is a schematic block diagram representing the process of misfire detection as performed by the misfire detection programmed logic 54 of FIG. 1.

The process is initiated at 100 one revolution after the monitored firing event. To this end, the crank sensor data for one or more previous engine cycles are buffered (i.e., stored in a buffer memory 44 or other computer readable memory such as RAM 43) so that a crank signals for at least a part of an engine cycle (in the present example two engine cycles, one engine cycle prior to potential misfire measurement point 90 and one engine cycle following the potential misfire measurement point 90) can be provided to process logic 104. Accordingly, in the present example, crank pulses n to n minus 16 at 30° CA intervals are provided to process logic 104. The process logic 104 processes the crank sensor data from the last two engine cycles (4 revolutions in the case of a 4-stroke engine) to determine the $\Delta\omega$ values for $\Delta\omega$ 180, $\Delta\omega$ 360 and $\Delta\omega$ 720 as represented in FIG. 3. The $\Delta\omega$ signals 106 are provided to calibration threshold logic 108 which determines whether any of the calculated $\Delta\omega$ signals cross preset calibration thresholds representative of potential misfire events. The output of the calibration threshold logic 108 is sets of ones or zeros 110 which are provided to misfire type detection logic 112 which performs a logical comparison of the various $\Delta\omega$ threshold outputs. Although in the present example crank sensor data for at least two previous engine cycles are buffered so that a crank signals for two engine cycles can be provided to process logic 104, in another example crank sensor data for another number of whole or part engine cycles can be buffered and/or crank signals for another number of engine cycles can be provided to process logic 104.

Figure 5:
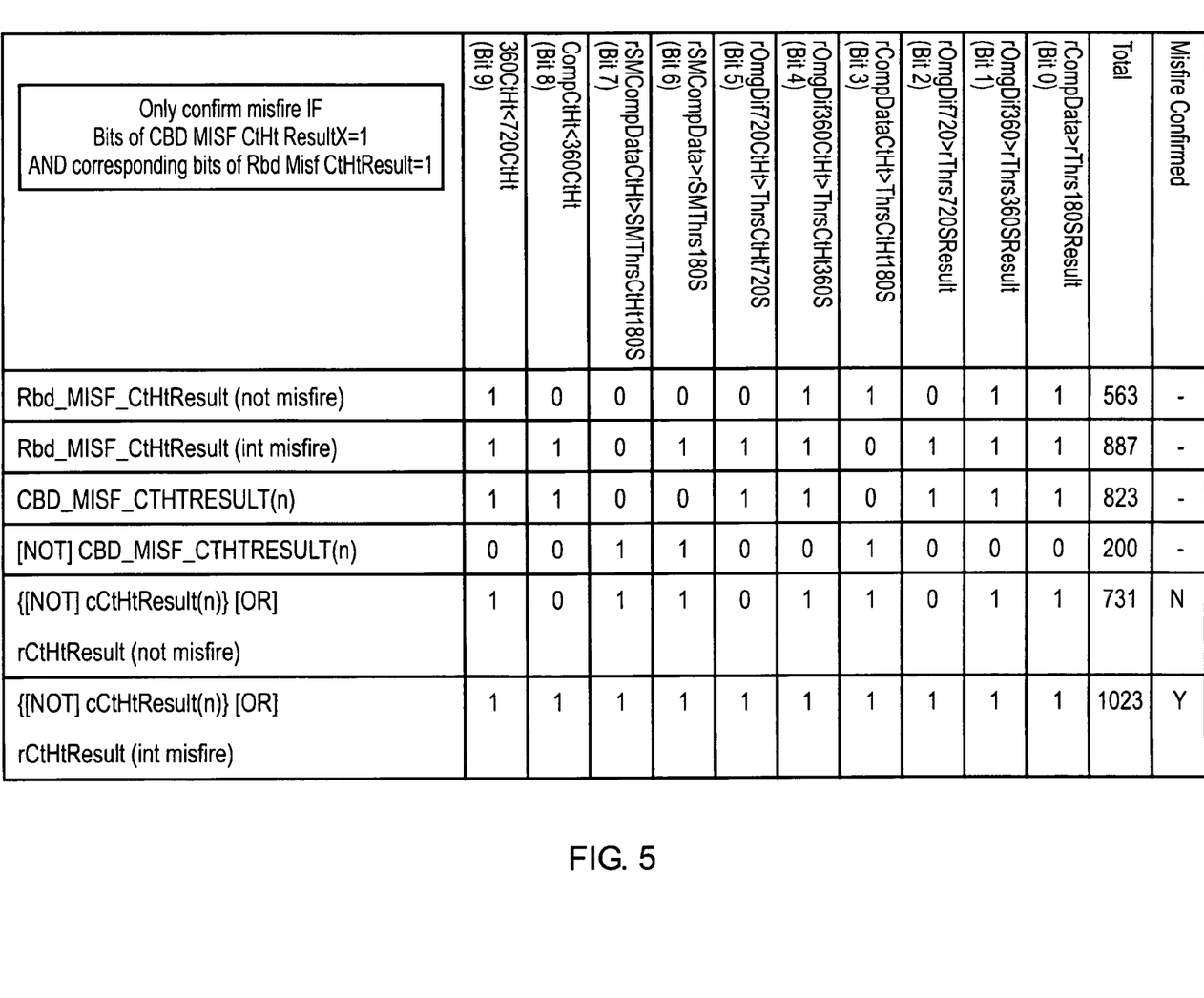
FIG. 5 illustrates an example of a logic table.

FIG. 5 illustrates a table showing the logical relationships between misfire signals resulting from the various $\Delta\omega$ calculations and thresholding operations. Confirmation of threshold crossing of multiple types of $\Delta\omega$ calculation can be expressed in a single number expressed as a binary array. Using a logical comparison of each bit of this result for the monitored firing event (Rbd_MISF_CtHtResult) to each bit of a calibrated misfire pattern recognition constant (CBD_MISF_CTHTRESULT(n)) can result in a pattern recognition for a misfire. This pattern recognition logic allows for many "noisy" individual $\Delta\omega$ calculations to be analyzed, but misfire is only to be confirmed if all relevant signal types characteristic of a misfire can be determined to be in a misfired condition.

The output of misfire detection logic 112 is sets of ones and zeros in accordance with the logical table represented in FIG. 5. Misfire confirmation logic 116 performs a logical comparison of the values in the table of FIG. 5 and outputs a signal 118 to misfire confirmation logic 120. In response to detection of a misfire in logic 120, a signal is output 121 to the increment misfire count 124 to record the detected misfire. For example, the misfire count can be in the form of a count-up counter and the count can be incremented on each misfire detected.

The current count 126 of the misfire counter 124 can be provided to fault condition detection logic 128 that can be operable to record a fault condition and/or to illuminate the malfunction indicator lamp (MIL) 56 if the misfire count crosses a fault threshold. The misfire count can be reset as appropriate in order to detect a misfire rate, as opposed to a total number of misfires.

Accordingly, in an example embodiment as described above, misfire detection can be delayed by one, or more, engine cycles and detection of a misfire can be judged on the response of the internal combustion engine to recovery from the misfire (i.e., on exit from the misfire). In another embodiment, conventional monitoring of a misfire signal on entry to the misfire can also be performed (i.e., with regard to FIG. 3, that the comparisons can be made of the $\Delta\omega$ 180, $\Delta\omega$ 360, $\Delta\omega$ 720 values can be determined on the basis of the $\omega$ values that precede the misfire event (i.e., on the left-hand side of the Figure) in addition to the determinations indicated in FIG. 3.

In an embodiment of the present invention, pattern recognition is applied to all signals in order that each of the misfire detection methods is in agreement that a monitored event was a misfire before a misfire is recorded. This reduces the potential for incorrectly identified misfire events.

Figure 6:
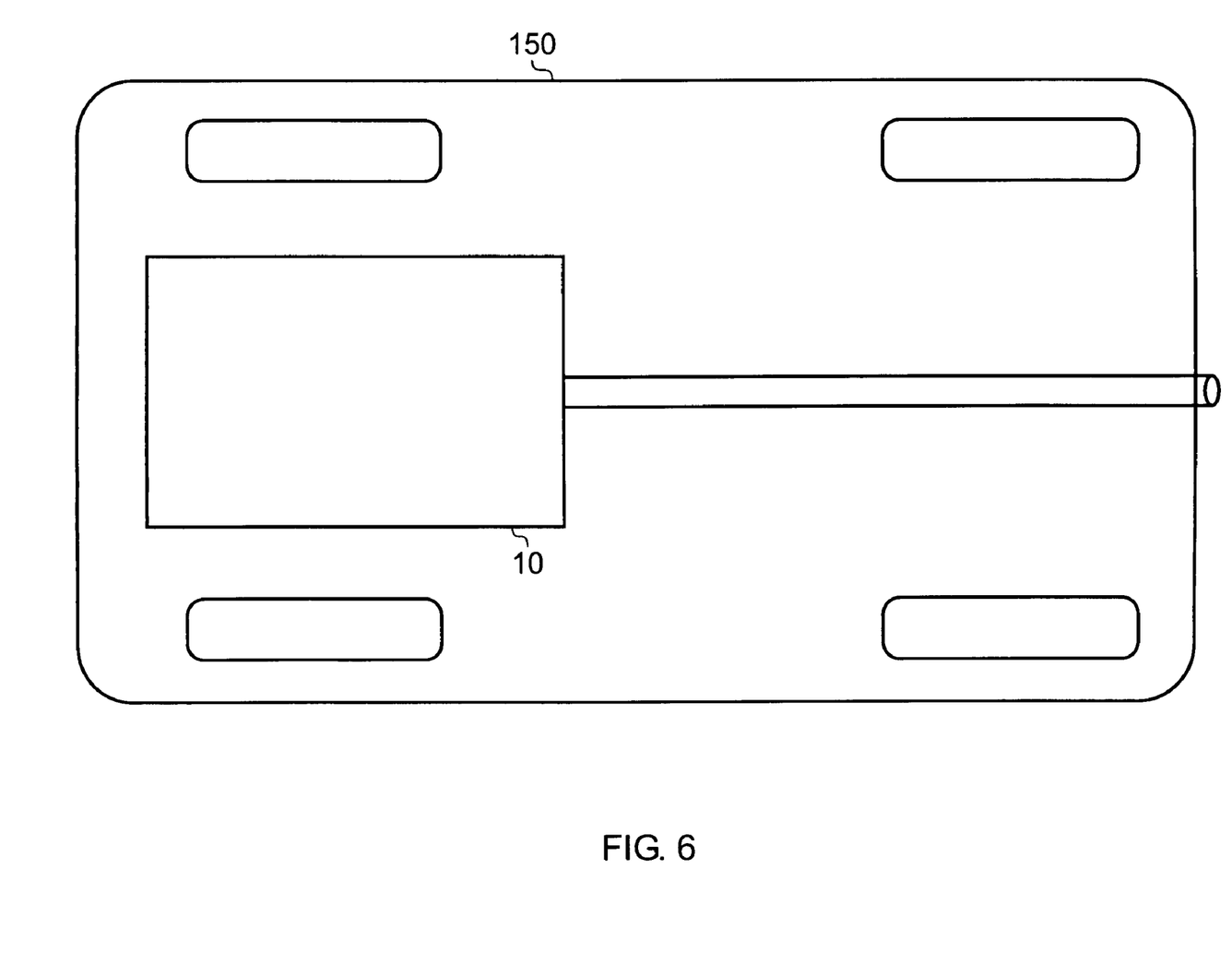
FIG. 6 is a schematic representation of a vehicle.

FIG. 6 is a schematic representation of a vehicle 150 including the engine system 10 described hereinabove.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A method of monitoring for a misfire event in an internal combustion engine, the method comprising:
    monitoring signals representative of engine speed for successive engine revolutions at least subsequent to a firing event;
    storing the monitored speed signals for each revolution in a non-transitory machine readable storage medium;
    processing the stored monitored speed signals to detect changes in the monitored speed signals;
    detecting changes in the monitored speed signals indicative of an actual misfire event; and
    changing a misfire count in response to detected changes in the monitored speed signals indicative of the firing event being an actual misfire event;
    wherein processing the monitored speed signals comprises:
        generating speed difference signals in respect of the firing event over successive engine revolutions at least subsequent to the firing event;
        comparing the speed difference signals with respective calibration threshold values representative of different potential misfire events to determine a set of values, each value having either a first value where a speed difference signal crosses its respective calibration threshold or a second value where a speed difference signal does not cross its respective calibration threshold;
        logically comparing the determined set of values to a predetermined misfire pattern having a set of values to produce a comparison result pattern; and
        confirming the actual misfire event or not based on the comparison result pattern;
    wherein the misfire count is changed in response to determining a set of comparison result indicators, of the comparison result pattern, indicative of an actual misfire event.

2. The method of claim 1, wherein detecting the speed difference signals comprises generating respective speed difference signals representative of one or more of 180, 360 and 720 crank angle degrees in respect of the firing event based on the monitored signals representative of engine speed subsequent to the firing event.

3. The method of claim 1, wherein detecting the speed difference signals comprises generating multiple speed different signals in respect to the firing event based on the monitored signals representative of engine speed subsequent to the firing event.

4. The method of claim 1, wherein detecting the speed difference signals comprises generating speed difference signals representative of each of 180, 360 and 720 crank angle degrees in respect of the firing event based on the monitored signals representative of engine speed subsequent to the firing event.

5. The method of claim 1, further comprising setting a fault condition in response to the fault count reaching a fault threshold count value.

6. The method of claim 1 wherein determination of a misfire event is delayed by one engine cycle with respect to an actual misfire event.

7. The method of claim 1, wherein the processing of the monitored signals is performed for monitored signals stored for at least two engine cycles subsequent to the misfire event to detect changes in the monitored speed signals.

8. An engine control unit for an internal combustion engine, the engine control unit including misfire detection logic operable to monitor for a misfire event in the internal combustion engine, the misfire detection logic comprising:
    signal monitor logic operable to monitor signals representative of engine speed for successive engine revolutions at least subsequent to a firing event;
    storage logic operable to store the monitored speed signals for each revolution in a non-transitory machine readable storage medium;
    processing logic operable to process the stored monitored signals to detect changes in the monitored speed signals;
    detection logic operable to detect changes in the monitored speed signals indicative of an actual misfire event; and
    a misfire counter logic operable change a misfire count in response to detected changes in monitored speed signals indicative of the firing event being an actual misfire event;
    wherein the processing logic is operable to:
        generate speed difference signals in respect of the firing event over successive engine revolutions at least subsequent to the firing event;
        compare the speed difference signals with respective calibration threshold values representative of different potential misfire events to determine a set of values, each value having either a first value where a speed difference signal crosses its respective calibration threshold or a second value where a speed difference signal does not cross its respective calibration threshold;

logically compare the determined set of values to a predetermined misfire pattern having a set of values to produce a comparison result pattern; and confirm the actual misfire event or not based on the comparison result pattern wherein the misfire counter is operable to change the misfire count in response to determining a set of comparison result indicators, of the comparison result pattern, indicative of an actual misfire event.

9. The engine control unit of claim 8, wherein the processing logic is operable to generate respective speed difference signals representative of one or more of 180, 360 and 720 crank angle degrees in respect of the firing event based on the monitored signals representative of engine speed subsequent to the firing event.

10. The engine control unit of claim 8, wherein the processing logic is operable to generate multiple speed different signals in respect of the firing event based on the monitored signals representative of engine speed subsequent to the firing event.

11. The engine control unit of claim 10, wherein the processing logic is operable to generate speed difference signals representative of each of 180, 360 and 720 crank angle degrees in respect of the firing event based on the monitored signals representative of engine speed subsequent to the firing event.

12. The engine control unit of claim 8, further comprising fault detection logic operable to setting a fault condition in response to the fault count reaching a fault threshold count value.

13. The engine control unit of claim 8, wherein the processing of monitored signals is performed for monitored signals stored for two previous engine cycles subsequent to the misfire event to detect changes in the monitored speed signals.

* * * * *